May 8, 1956  W. H. RHINDRESS  2,744,483
FLOATING BOAT HOUSE

Filed Aug. 11, 1954  2 Sheets-Sheet 1

INVENTOR,
Walker H. Rhindress
BY
Nathaniel Frucht
ATTORNEY

May 8, 1956  W. H. RHINDRESS  2,744,483
FLOATING BOAT HOUSE

Filed Aug. 11, 1954  2 Sheets-Sheet 2

INVENTOR
Walter H. Rhindress
BY Nathaniel Frucht
ATTORNEY

United States Patent Office 2,744,483
Patented May 8, 1956

2,744,483

FLOATING BOAT HOUSE

Walter H. Rhindress, Braintree, Mass.

Application August 11, 1954, Serial No. 449,205

1 Claim. (Cl. 114—.5)

The present invention relates to a boat house and has particular reference to a boat house of the floating portable type.

The principal object of the invention is to provide a portable floating boat house which securely houses a boat.

Another object of the invention is to provide a portable floating boat house which completely encloses and protects a boat garaged therein.

A further object of the invention is to provide a portable floating boat house for off-shore anchorage and into which ingress and egress with a boat is easy and quick.

An additional object of the invention is to provide a portable floating boat house which may be completely closed and locked and which has a side door for entry and exit.

With the above and other objects and advantageous features in view, the invention consists of a novel arrangement of parts more fully disclosed in the detailed description following, in conjunction with the accompanying drawings, and more specifically defined in the claim appended thereto.

It has been found advantageous to provide a boat house of the floating type which may be anchored off shore and into which a boat may be floated for protection from the sea and the elements when the boat is not in use, the boat house having sides, a roof, a closed prow, an open rear end with doors which permit easy and quick inward and outward movement of the boat, and a side door for personnel using the boat. To this end, I provide a floating boat house, the boat house having a roof with an access door leading into the interior of the boat house, sides with rear doors which open to permit entrance of the boat and close to completely house a boat therein, and pontoons at the sides. The boat house preferably has no floor, and is provided with spaced struts for supporting the boat, an arrangement of pulleys, hooks and rope being provided within the boat house whereby the boat may be quickly pulled in and made secure.

Figure 1:
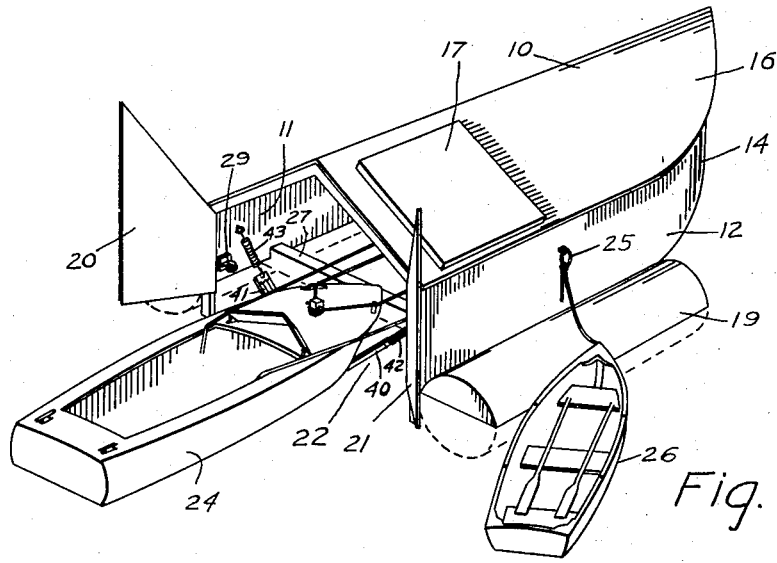
Fig. 1 is a perspective view of an illustrative portable floating boat house embodying the invention, showing a motor boat partially inside the boat house and a row boat secured to the outside.
Figure 2:
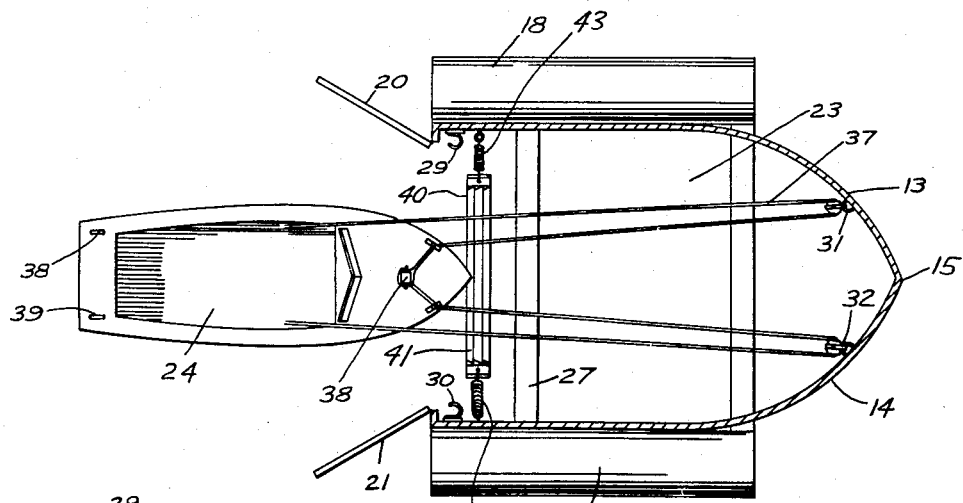
Fig. 2 is a top view of Fig. 1 without the row boat, the top of the boat house being removed.
Figure 5:
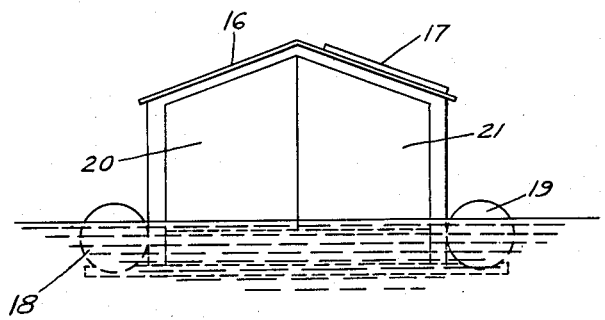
Fig. 5 is a rear view of the boat house with rear doors closed.
Figure 6:
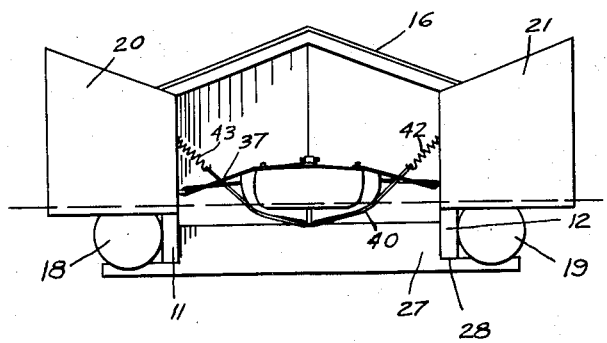
Fig. 6 is a view similar to Fig. 5 with the rear doors open and showing a motor boat garaged within the boat house and the positioning of the cables to lock the boat in place.

Referring to the drawings, Fig. 1 shows an illustrative boat house comprising a floating housing 10 which includes sides 11, 12 with forward curved portions 13, 14 forming a prow 15, a patched roof 16 having a hinged access or sliding auxiliary door 17, and pontoons 18, 19 secured to the sides 11, 12, see Fig. 2, whereby the housing 10 is held afloat; rear doors 20, 21 are hingedly secured to the sides 11, 12 and swing outwardly to open an entrance 22 to the interior 23 whereby a motor boat 24 may float into and out of the interior 23, and which when closed, as in Fig. 5, help to completely protect the motor boat from the elements. A ring 25 is provided at one side of the boat house to provide a fastening for a row boat 26. Spaced support struts 27, see Fig. 2, are secured to the sides and extend across the bottom of the housing with cutaway end portions 28, see Fig. 6, on which the pontoons seat. As will be seen most clearly in Fig. 6 of the drawings, the struts 27 are located slightly below the normal load water level of the housing 10, whereby the boat 24 may be manually pulled over the struts and into the housing in a manner hereinafter to be described. Once inside the housing, however, it will be understood that the boat is supported by the struts and hence is incapable of floating relative to said housing.

Figure 4:
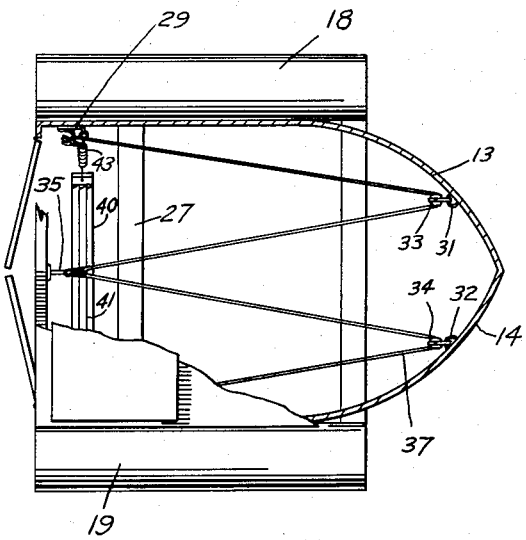
Fig. 4 is a top view of the boat house, parts broken away to disclose the haul cables.

The interior 23 is provided with hooks 29, 30 which are mounted at the lower rear of the sides 11, 12, spaced eye rings 31, 32 which are fastened to the curved prow portions 13, 14 and which carry swivel pulleys 33, 34, and a roof hook 35 attached to the rear roof cornice 36. A cable 37 is normally arranged to pass through the pulleys 33, 34, and around the roof hook 35, its free ends being tied to the hooks 29, 30 as illustrated in Fig. 4, when the interior of the boat house is vacant.

Figure 3:
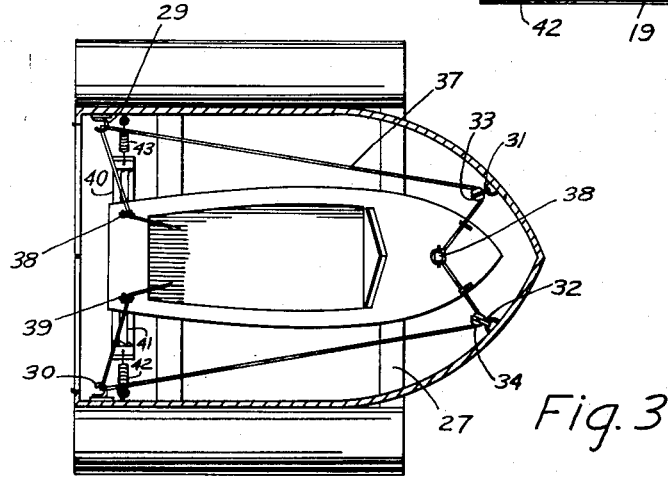
Fig. 3 is a view similar to Fig. 2, the motor boat being housed within the boat house.

Fig. 3 illustrates the arrangement of the rope 37 when the motor boat 24 is secured within the housing 10; the tied ends of the rope 37 which normally are around the roof hook 35 are looped around the motor boat front post 38, and the free ends are removed from the hooks 29, 30 and are pulled to move the boat into the housing and then are tied to the boat rear posts 38, 39, the cable being held taut and passing through the pulleys 33, 34 and the hooks 29, 30 as illustrated. This fastens the cable over the fore and aft parts of the boat, see Fig. 6, to hold the boat centrally seated on the struts 27, whereupon the doors 20, 21 may be securely locked, and the boat and boat house become one unit and moves as one on the waves, the boat house floating with the tide and having off-shore anchorage. The prow shaped configuration of the housing is advantageous not only in that it closely conforms to the contour of the boat whereby to provide a compact and efficient arrangement, but also in that it maintains pitching of the housing at a minimum in rough and windy weather. Entry and exit from the boat house is readily affected by the access door 17, which is preferably in the roof, but may, if desired, be in one side adjacent the ring 25. A scraper 40, see Fig. 2, having upstanding ridges 41 of resilient material on both sides is attached across the bottom of the interior of the boat house at the sides 11, 12, and includes end coil springs 42, 43, whereby the bottom of the boat may be cleaned every time the boat is housed by rubbing against the scraper.

It is now obvious that my construction provides a floating boat house which receives a motor boat and which completely protects it from the elements. The interior is easily accessible; since no boat cover is needed, the boat may be quickly put out and may be quickly housed, thus eliminating loss of time at the beginning and end of a course.

Although I have disclosed a specific constructional embodiment of the invention, it is obvious that changes in the size, shape, and arrangement of the parts may be made to meet different housing requirements for boats, without departing from the spirit or the scope of the invention as defined in the claim appended hereto.

I claim:

In a floating structure for housing small marine craft of relatively shallow draft, spaced vertical sides, a prow shaped forward portion joined to said vertical sides, spaced struts interposed between said vertical sides and positioned substantially adjacent and slightly below the normal load water level of the structure, said struts defining means for supporting a marine craft within said structure, a roof mounted on said sides and prow shaped portion and forming an enclosed housing therewith, portions secured to the lower edge of said sides along the outer surface thereof for supporting said structure in water, and pulley means secured to said forward portion for receiving a mooring cable therearound, said cable being adapted at one end thereof for securement with a marine craft whereby said craft may be drawn over the struts and into the housing by a manual pull on the other end of said cable.

References Cited in the file of this patent

UNITED STATES PATENTS

| | | |
|---|---|---|
| 622,232 | Inglis | Apr. 4, 1899 |
| 1,054,505 | Butters | Feb. 25, 1913 |
| 1,643,464 | McCullers | Sept. 27, 1927 |
| 1,896,546 | Kulik | Feb. 7, 1933 |
| 2,399,483 | Gouge | Apr. 30, 1946 |
| 2,429,381 | Watson | Oct. 21, 1947 |